(12) United States Patent
Mitsuyasu et al.

(10) Patent No.: US 11,407,050 B2
(45) Date of Patent: Aug. 9, 2022

(54) ELECTRICAL DISCHARGE MACHINING DEVICE, ELECTRICAL DISCHARGE MACHINING METHOD, AND DESIGN METHOD

(71) Applicant: Seibu Electric & Machinery Co., Ltd., Fukuoka (JP)

(72) Inventors: Takashi Mitsuyasu, Fukuoka (JP); Keisuke Tasaki, Fukuoka (JP)

(73) Assignee: Seibu Electric & Machinery Co., Ltd., Fukuoka (JP)

( * ) Notice: Subject to any disclaimer, the term of this patent is extended or adjusted under 35 U.S.C. 154(b) by 472 days.

(21) Appl. No.: 16/574,914

(22) Filed: Sep. 18, 2019

(65) Prior Publication Data
US 2020/0009670 A1    Jan. 9, 2020

Related U.S. Application Data

(62) Division of application No. 14/781,935, filed as application No. PCT/JP2014/056066 on Mar. 7, 2014, now Pat. No. 10,512,979.

(30) Foreign Application Priority Data

Apr. 4, 2013    (JP) .............................. JP2013-078211

(51) Int. Cl.
*B23H 1/02*      (2006.01)
*B23H 7/14*      (2006.01)

(52) U.S. Cl.
CPC ............... *B23H 1/022* (2013.01); *B23H 1/02* (2013.01); *B23H 7/14* (2013.01); *B23H 2300/22* (2013.01)

(58) Field of Classification Search
CPC ...... B23H 1/02; B23H 1/022; B23H 2300/22; B23H 7/14
See application file for complete search history.

(56) References Cited

U.S. PATENT DOCUMENTS 6,580,048 B2    6/2003   Hashimoto et al.
2007/0289949 A1* 12/2007   Suzuki .................. B23H 1/024
                                                       219/69.13

(Continued)

FOREIGN PATENT DOCUMENTS

JP           63039736 A2     2/1988
JP           63312017 A2    12/1988

(Continued)

OTHER PUBLICATIONS

International Search Report dated Jun. 10, 2014 filed in PCT/JP2014/056066.

*Primary Examiner* — Dana Ross
*Assistant Examiner* — Joe E Mills, Jr.
(74) *Attorney, Agent, or Firm* — Rankin, Hill & Clark LLP

(57) ABSTRACT

An electrical discharge machining device provided, using a floating capacitance to provide a machining target with improved surface roughness. An electrical discharge machining device 1 includes a current supply circuit 3 that supplies a current to a gap between an electrode 17 and a machining target 19 so as to provide electrical discharge machining. A floating capacitance portion 21 occurs between the electrode 17 and the machining target 19 in the electrical discharge machining. The floating capacitance portion 21 supplies its stored charge to the gap in the electrical discharge machining. A capacitor 11 stores a charge before the floating capacitance portion 21 is discharged. After the floating capacitance portion is discharged, the capacitor 11 charges the floating capacitance portion 21. The floating capacitance portion 21 is discharged again after it is charged. Such an operation generates a pulse current, thereby providing electrical discharge machining.

8 Claims, 10 Drawing Sheets

(56) References Cited

U.S. PATENT DOCUMENTS

| | | |
|---|---|---|
| 2010/0308017 A1 | 12/2010 | Hashimoto |
| 2012/0228268 A1* | 9/2012 | Morita .................. B23H 1/022 219/69.11 |
| 2013/0292360 A1 | 11/2013 | Okane et al. |

FOREIGN PATENT DOCUMENTS

| | | |
|---|---|---|
| JP | 02279214 | 11/1990 |
| JP | 558845 | 8/1993 |
| JP | 06339736 | 12/1994 |
| JP | 2005153078 A2 | 6/2005 |
| JP | 2005329498 A2 | 12/2005 |
| WO | 2009096026 A1 | 8/2009 |
| WO | 2012140735 A1 | 10/2012 |

* cited by examiner (a)

(b)

(c)

ELECTRICAL DISCHARGE MACHINING DEVICE, ELECTRICAL DISCHARGE MACHINING METHOD, AND DESIGN METHOD

TECHNICAL FIELD

The present invention relates to an electrical discharge machining device, an electrical discharge machining method, and a design method, and particularly to an electrical discharge machining device and the like including a current supply circuit configured to supply a current to a gap between an electrode and a machining target so as to provide electrical discharge machining.

BACKGROUND ART

Conventionally, as described in Patent document 1, for example, there are known electrical discharge machining devices configured to apply a pulse voltage to an electrode gap between an electrode and a machining target so as to supply a pulse current to the gap between the electrode and the machining target, so as to process the machining target.

A technique is described in Patent document 2 in which a floating capacitance that occurs in series between the electrode and the machining target is used to generate a pulse having a pulse width that is shorter than the response time of a switching element.

CITATION LIST

Patent Literature

[Patent Document 1]
Japanese Patent Application Laid Open No. 2005-153078
[Patent Document 2]
Japanese Patent Application Laid Open No. 2005-329498

SUMMARY OF INVENTION

Technical Problem

With such an electrical discharge machining device, the distance between the electrode and the machining target is controlled such that a discharge occurs in the electrode gap. When the discharge occurs in the electrode gap between the electrode and the machining target, a current flows through the gap between the electrode and the machining target, thereby forming an electrically conducting path.

Let us consider a case in which single-pulse electrical discharge machining is performed. As the amount of charge used for the discharge becomes larger, the size of the discharge crater becomes larger. On other other hand, as the discharge period becomes longer, the machining time also becomes longer. In this case, such an arrangement requires a reduced relative movement speed of the electrode with respect to the machining target surface. This leads to adverse effects such as cutting marks or the like due to various kinds of instability. That is to say, it is difficult for such an arrangement to provide improved surface roughness.

Thus, in order to provide improved surface roughness, there is a demand for a technique for providing both a reduced peak current of the current pulse and a reduced pulse applying time under the required conditions of the electrical discharge machining.

As described above, in the design of such a conventional electrical discharge machining device, it is important to control the pulse voltage. For example, as described in Patent documents 1 and 2, a pulse voltage is applied to the electrode gap between the electrode and the machining target by means of an external circuit, thereby supplying the pulse voltage between the electrode and the machining target.

However, as described in Patent document 1, with such an electrical discharge machining device, a floating capacitance occurs in the electrode gap between the electrode and the machining target. When a voltage is applied to the electrode gap between the electrode and the machining target, the floating capacitance between the electrode and the machining target is charged. Subsequently, when a discharge occurs in the rode gap between the electrode and the machining target, the charge stored in the floating capacitance is discharged to the electrode gap.

There is a limit to an approach to reducing the gap between the machining target and the electrode. Accordingly, in practical use, the voltage applied to the gap between the electrode and the machining target is preferably raised as much as possible. The charge Q stored in the floating capacitance that occurs in the gap between the electrode and the machining target is represented by the product of the electric capacitance C and the voltage V. Accordingly, as the voltage applied to the gap between the electrode and the machining target becomes larger, the amount of charge stored in the floating capacitance becomes larger. Here, the current is represented by the temporal differentiation of Q (dQ/dt). Thus, as the voltage applied to the gap between the electrode and the machining target becomes larger, the current that flows through the gap between the electrode and the machining target becomes larger as compared with the expected value.

As described above, with conventional techniques, such a floating capacitance occurs as a capacitance unintended by the designer. That is to say, such a floating capacitance is nothing but a difficulty in the design. Accordingly, in conventional design approaches, such a floating capacitance is reduced such that almost all the current to be used flows from a power supply, in order to control the current supplied to the gap between the electrode and the machining target.

It is a purpose of the present invention to provide an electrical discharge machining device and the like configured to use a floating capacitance to provide improved surface roughness of a machining target.

Solution of Problem

The first aspect of the present invention is an electrical discharge machining device comprising a current supply circuit that supplies a current to a gap between an electrode and a machining target so as to provide electrical discharge machining, wherein, in the electrical discharge machining, after a charge stored in a floating capacitance portion that occurs in the gap between the electrode and the machining target is supplied to the gap, the floating capacitance portion is charged and discharged again.

The second aspect of the present invention is the electrical discharge machining device according to the first aspect of the present invention, further comprising a charge storage unit that stores a charge before a discharge of the floating capacitance portion is completed, and that charges the floating capacitance portion using the charge thus stored after the floating capacitance portion is discharged.

The third aspect of the present invention is the electrical discharge machining device according to the second aspect of the present invention, wherein the current supply circuit comprises a resistor unit connected in series with the electrode and the machining target, and wherein the charge storage unit is connected in parallel with the resistor unit.

The fourth aspect of the present invention is the electrical discharge machining device according to the second or the third aspect of the present invention, wherein the current supply circuit comprises a coil unit that adjusts an inductance between the charge storage unit and the floating capacitance portion.

The fifth aspect of the present invention is the electrical discharge machining device according to any one of the first through the fourth aspect of the present invention, wherein the current supply circuit comprises a switching element that controls whether or not a voltage applied to the gap between the electrode and the machining target, and wherein the switching element continuously applies a voltage to the gap between the electrode and the machining target during a period in which the floating capacitance portion is discharged and the floating capacitance portion is charged and discharged again.

The sixth aspect of the present invention is the electrical discharge machining device according to any one of the first through the fifth aspect of the present invention, wherein the current supply circuit comprises a switching element that controls whether or not a voltage is applied to the gap between the electrode and the machining target, and wherein, the electrical discharge machining, the switching element is configured to continuously apply a voltage to the gap between the electrode and the machining target, or otherwise is configured to perform an on/off control operation so that a voltage is applied to the gap between the electrode and the machining target, the voltage application is suspended, and the voltage is applied again, so as to provide insulation recovery between the electrode and the machining target.

The seventh aspect of the present invention is the electrical discharge machining device according to any one of the first through the sixth aspect of the present invention, wherein the machining target is fixedly mounted on a worktable configured such that a current is supplied to the machining target via the worktable, and wherein the worktable has a multi-layer structure comprising an insulating layer that provides electrical insulation between foot members of the worktable and a holder that fixedly holds the machining target and an electrically conducting layer that allows a current to be supplied to the machining target.

The eighth aspect of the present invention is the electrical discharge machining device according to any one of the first through the seventh aspect of the present invention, wherein wire electrical discharge machining is performed as the electrical discharge machining, and wherein the electrical discharge machining device comprises an electrode switching circuit that switches the polarities of the electrode and the machining target with a predetermined frequency.

The ninth aspect of the present invention is an electrical discharge machining method employed in a current supply circuit that supplies a current to a gap between an electrode and a machining target so as to provide electrical discharge machining, the electrical discharge machining method comprising floating capacitance portion charging in which a voltage is applied to the gap so as to charge a floating capacitance portion that occurs between the electrode and the machining target, floating capacitance portion discharging in which, when a voltage between the electrode and the machining target exceeds a predetermined discharge voltage, the charge stored in the floating capacitance portion is discharged to the gap such that the voltage between the electrode and the machining target becomes lower than the predetermined discharge voltage, floating capacitance portion re-charging in which the floating capacitance portion is charged again, and floating capacitance portion re-discharging in which, when the voltage between the electrode and the machining target again exceeds the predetermined discharge voltage, the charge stored in the floating capacitance portion is discharged to the gap.

The tenth aspect of the present invention is a design method for designing a current supply configured to supply a current to a gap between an electrode and a machining target so as to provide electrical discharge machining, wherein the current supply circuit, in the electrical discharge machining, after a charge stored in a floating capacitance portion that occurs in a gap between the electrode and the machining target is supplied to the gap, charges the floating capacitance portion, and discharges the floating capacitance again, wherein the current supply circuit comprises a power supply unit, a resistor unit, a coil unit, and a charge storage unit connected in par with the resistor unit, wherein the power supply unit, the resistor unit and the coil unit are connected in series with the electrode and the machining target, and wherein the design method comprises resistance determining in which a resistance of the resistor unit is determined based on a current value that flows from the power supply unit side to the floating capacitance portion side, inductance determining in which an inductance of the coil unit is determined based on a period of time from a time point at which the electrical discharge machining is started to a time point at which the current that flows from the power supply unit side to the floating capacitance portion side rises, and charge storage unit capacitance determining in which a capacitance of the charge storage unit is determined based on a change in a voltage at the gap after the electrical discharge machining is started.

It should be noted that the charge storage unit is configured as a capacitor, for example. Such a capacitor functions as a high-speed capacitor or a quick-charge capacitor configured to charge a floating capacitance with a high charging rate after the floating capacitance is discharged.

Advantageous Effects of Invention

With each aspect according to the present invention, by supplying a current pulse to the gap between the electrode and the machining target by means of the floating capacitance, such an arrangement allows the peak current of the current pulse to be reduced. That is to say, the current that flows through the gap between the electrode and the machining target is mainly supplied from the floating capacitance. With each aspect according to the present invention, by actively using the floating capacitance, i.e., by using the charge stored in the floating capacitance to generate a current pulse, such an arrangement allows the peak current of the current pulse to be reduced, thereby providing improved surface roughness.

Furthermore, with the second aspect of the present invention, the charge storage unit allows the floating capacitance to be charged with a high charging rate after the floating capacitance discharged. Such an arrangement requires only a short period of time to recover the voltage required for the occurrence of a discharge between the electrode and the machining target even if the current pulse has a small peak current. Thus, such an arrangement provides a discharge with a reduced period, thereby increasing the number of times a discharge occurs per unit time (discharge frequency) Thus, such an arrangement provides improved surface roughness. Furthermore, such an arrangement provides high-efficiency machining, thereby improving the machining rate. In addition, such an arrangement is capable of reducing the probability of the effects of disturbance (vibration applied externally, fluctuation in the power supply voltage, variation in the temperature, and the like). This provides machining with improved surface roughness in a stable manner.

Furthermore, with the third aspect of the present invention, the charge storage unit is connected in parallel with the resistor. Such an arrangement allows the floating capacitance to be charged in a simpler manner after the floating capacitance is discharged. This provides an electrical discharge with a short period using a small amount of charge, thereby providing the machining target with improved surface roughness in a stable manner.

Furthermore, with the fourth aspect of the present invention, the coil unit is provided so as to adjust the inductance between the charge storage unit and the floating capacitance unit. When the floating capacitance unit is discharged, such an arrangement is capable of adjusting the time required before a sufficient amount of current flows to the electrode gap from the charge storage unit and the power supply. By keeping a significantly large amount of current from flowing through the electrode gap before the floating capacitance portion is discharged, almost all the current used to generate an electrical discharge in the electrode gap can be supplied from the floating capacitance. Such an arrangement is capable of providing a small electrical discharge. Furthermore, mainly the floating capacitance is charged, thereby allowing the period of an electrical discharge to be reduced. Thus, by providing such a coil unit, such an arrangement is capable of reducing the time required before the floating capacitance portion is discharged, and is charged and discharged again, and of adjusting the peak voltage that contributes to an electrical discharge.

Furthermore, with the fifth aspect of the present invention, a pulse current is generated by means of the floating capacitance. Thus, during electrical discharge machining, such an arrangement is capable of generating a pulse current even if the switching element is in the on state.

Furthermore, with the sixth aspect of the present invention, by selecting the control operation from among the on control operation and the on/off control operation, such an arrangement is capable of providing reliable insulation recovery between the electrode and the machining target in a sure manner. That is to say, with a wire electrical discharge machining device employing oil, such an arrangement provides high-speed insulation recovery between the wire electrode and the machining target. Thus, such an arrangement is capable of generating a pulse current by means of the on control operation. For example, the time interval required for the on control operation to generate the pulse current is defined as a time interval reference. When the insulation recovery time required for a given machining liquid is sufficiently shorter than the time interval reference thus defined, the on control operation is performed so as to generate a pulse current. On the other hand, in a case in which water is employed as the machining liquid such an arrangement provides poor insulation recovery between the wire electrode and the machining target. Thus, in this case, such an arrangement performs the on/off control operation so as to provide insulation recovery in a sure manner. For example, at least in a case which the insulation recovery time required for a given machining liquid is longer than the time interval of the pulse current generated in the on control operation, such an arrangement performs the on/off control operation so as to provide insulation recovery in a sure manner, thereby generating a pulse current. For example, such an arrangement is capable of performing the on/off control operation so as to provide insulation recovery in a sure manner, in addition to being capable of performing the on control operation, which is switched according to whether or not the insulation recovery required for a given machining liquid is shorter than a predetermined period of time. Thus, such an arrangement provides insulation recovery in a sure manner.

Furthermore, with the seventh aspect of the present invention, such an arrangement allows the floating capacitance between the wire electrode and the machining target to be minimized. Thus, such an arrangement allows the amount of charge used for a single instance of electrical discharge to be minimized, thereby requiring only a minimum-size discharge crater to provide a single instance of electrical discharge machining. This provides improved surface roughness. With conventional techniques, a worktable is formed of a ceramic material (insulating material), for example, and a workpiece is provided with electrical wiring. However, with such an arrangement in which such a workpiece is provided with electrical wiring, this leads to a problem of increased restrictions. With the seventh aspect of the present invention, the worktable has a multi-layer structure. For example, such a multi-layer structure includes an insulating layer and an electrically conducting layer. The foot members of the worktable are each formed of a metal material. The hardness of such a metal material is not restricted in particular. The table portion, which is an insulating layer, is configured as a ceramic layer, for example, which provides insulation between each foot member of the worktable and a holder unit configured to fixedly hold the machining target. The metal layer, i.e., an electrically conducting layer, is arranged in order to allow a current to be supplied to the machining target. Furthermore, the metal layer is configured to allow a current to readily flow and to have a hardness that provides high scratch resistance to mounting the machining target. Examples of such a material include a steel alloy subjected to heat treatment. With the seventh aspect of the present invention, such an arrangement of a worktable requires only a smaller area of the electrically conducting portion of the worktable to be in contact with the workpiece than the worktable to which current flows overall, thereby providing reduced floating capacitance.

Furthermore, with the eighth aspect of the present invention, in a case of employing water, for example, as the machining liquid configured as an insulator between the electrode and the machining target, in many cases, such an arrangement has a problem of galvanic corrosion. In order to solve such a problem, the polarities of the machining target and the electrode are switched with a predetermined frequency so as to suppress the occurrence of galvanic corrosion. The power supply includes a switching apparatus configured to switch the polarities. There is a difference between an arrangement employing oil and an arrangement employing water in terms of characteristics such as an oxidation-reduction reaction or elution of a material that forms the machining target, deposition of a foreign material, etc. Thus, there is a need to provide a difference between an arrangement employing oil and an arrangement employing water in the power supply configuration and the control method for controlling the power supply polarities. In a case of employing oil or the like that provides high insulation as the machining liquid, the distance between the electrode and the machining target can be reduced.

DESCRIPTION OF EMBODIMENTS

Description will be made below with reference to the drawings regarding examples of the present invention. It should be noted that the embodiment of the present invention is not restricted to such examples of the present invention.

EXAMPLES

Figure 1:
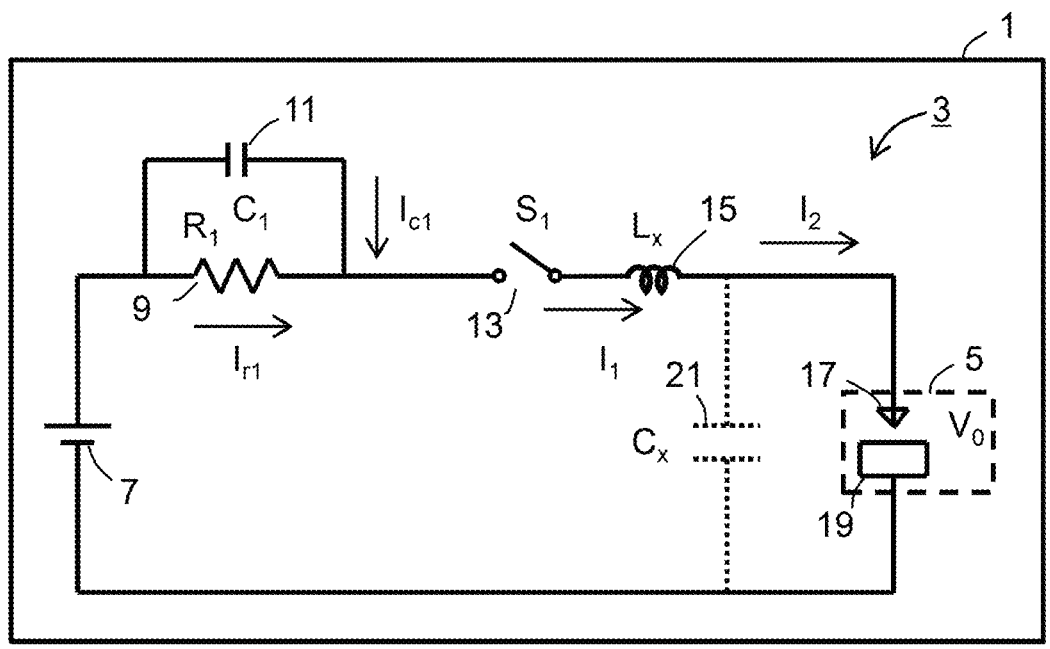
FIG. 1 is a diagram showing an example of a schematic configuration of an electrical discharge machining device according to an embodiment of the present invention.

FIG. 1 is a diagram showing a schematic example configuration of an electrical discharge machining device according to an embodiment of the present invention. The electrical discharge machining device 1 includes a current supply circuit 3. The current supply circuit 3 includes an electrical discharge machining unit 5, a power supply 7, a resistor 9 (which corresponds to an example of the "resistor unit" in the appended claims), a capacitor 11 (which corresponds to an example of the "charge storage unit" in the appended claims), a switching element 13 (which corresponds to an example of the "switching element" in the appended claims), and a coil 15 (which corresponds to an example of the "coil unit" in the appended claims).

The electrical discharge machining unit 5 is configured to provide wire electrical discharge machining. The electrical discharge machining unit 5 includes an electrode 17 (which corresponds to an example of the "electrode" in the appended claims) and a machining target 19 (which corresponds to an example of the "machining target" in the appended claims). A machining liquid is provided to the gap between the electrode 17 and the machining target 19 so as to provide insulation between them. The machining liquid is configured as water or otherwise oil, for example. When a voltage is applied to the gap between the electrode 17 and the machining target 19, a floating capacitance 21 (which corresponds to an example of the "floating capacitance portion" in the appended claims) occurs in the gap between the electrode 17 and the machining target 19.

Description will be made regarding the connection relations in the current supply circuit 3. In the current supply circuit 3, the electrical discharge machining unit 5, the power supply 7, the resistor 9, the switching element 13, and the coil 15 are connected in series. The capacitor 11 is connected in parallel with the resistor 9.

Description will be made regarding the symbols for describing the current supply circuit 3 $R_1$ represents the resistance value of the resistor 9. $C_1$ represents the capacitance of the capacitor 11. The switching element 13 is also represented by "$S_1$". $L_z$ represents the inductance the coil 15. $C_x$ represents the capacitance of the floating capacitance 21. $I_{r1}$ represents the current that flows through the resistor 9. $I_{c1}$ represents the current supplied from the capacitor 11. $I_1$ represents the current that flows through the coil 15. Here, the current $I_1$ is represented by $I_1 = I_{r1} + I_{c1}$. $I_2$ represents the current supplied to the electrode 17. $V_0$ represents the voltage between the electrode 17 and the machining target 19.

The power supply 7 is configured to apply a voltage between the electrode 17 and the machining target 19.

The resistor 9 is arranged in order to control the current that flows from the power supply 7.

The capacitor 11 is arranged in order to store a charge using the current received from the power supply 7. The capacitor 11 is used to charge the floating capacitance 21 again after the floating capacitance 21 is discharged.

The switching element 13 is arranged in order to control the on state and off state of the electrical connection between the power supply 7 and the electrode 17. In a case in which finishing machining is performed using the floating capacitance 21, the switching element 13 may be maintained in the on state. Also, in this case, the switching element 13 may be switched between the on state and off state with a predetermined frequency. The power supply circuit shown in FIG. 1 is capable of selecting the control operation from among the on control operation and the on/off control operation.

For example, in a case in which the electrical discharge machining device is configured as a wire electrical discharge machining device using oil, such an arrangement provides fast insulation recovery between the wire electrode and the machining target. Thus, such an arrangement allows the on control operation to generate a pulse current. For example, the time interval required for the on control operation to generate the pulse current is defined as a time interval reference. When the insulation recovery time required for a given machining liquid is sufficiently shorter than the time interval reference thus defined, the on control operation is performed so as to generate a pulse current. On the other hand, in a case in which water is employed as the machining liquid, such an arrangement provides poor insulation recovery between the wire electrode and the machining target. Thus, in this case, such an arrangement performs the on/off control operation so as to, provide insulation recovery in a sure manner. For example, in a case in which the insulation recovery time required for a given machining liquid is shorter than a predetermined time, such an arrangement may perform the on control operation so as to generate a pulse current. Conversely, in a case in which the insulation recovery time required for a given machining liquid is longer than a predetermined time, such an arrangement may perform the on/off control operation, which provides insulation recovery in a sure manner, so as to generate a pulse current.

The coil 15 forms an LRC circuit together with the resistor 9, the capacitor 11, and the floating capacitance 21. The coil 15 is arranged in order to adjust the inductance between the capacitor 11 and the floating capacitance 21. Such an arrangement is capable of reducing the time required before the floating capacitance 21 is discharged, charged, and discharged again.

It should be noted that the present invention differs from an arrangement disclosed in Patent document 2, for example, which is configured to use resonance to provide a pulse current having a higher frequency than that of the switching operation. That is to say, the inductance value $L_x$ of the coil 15 has an effect on the build-up rate (represented by the line 47 shown in FIG. 5) and the peak of the V value. For example, in a case in which the inductance value $L_x$ of the coil 15 is increased, the period becomes shorter, but the peak of the V value becomes larger. This leads to an increased amount of charge used for the electrical discharge machining, resulting in adverse effects on the surface roughness. Thus, as a conceivable approach, the inductance value $L_x$ of the coil 15 may be set to a value that is equivalent to the coil inductance of the wiring (or otherwise may be set to a value that can be regarded as an equivalent value to the coil inductance of the wiring). Similarly, the build-up is affected by the $C_1$ value. Thus, by adjusting the capacitance $C_1$ of the capacitor 11 and the inductance value $L_x$ of the coil 15, such an arrangement allows the build-up to be designed as desired.

With the electrical discharge machining device 1, when a discharge occurs between the electrode gap between the electrode 17 and the machining target 19, a current flows through the gap between the electrode 17 and the machining target 19, thereby forming an electrically conducting path. The electrical discharge machining unit 5 is configured to apply a voltage to the electrode gap between the electrode 17 and the machining target 19 so as to supply a current to the gap between the electrode 17 and the machining target 19, in order to process the machining target 19. The distance between the electrode 17 and the machining target 19 is controlled such that a discharge occurs in the electrode gap.

Figure 2:
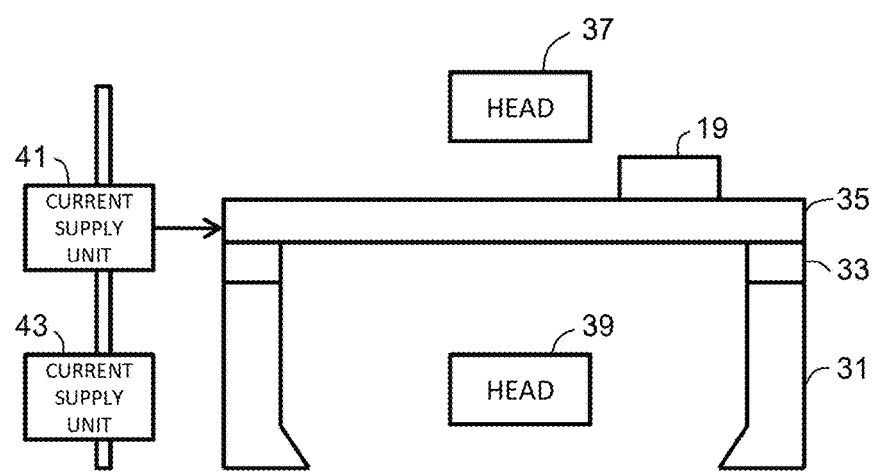
FIG. 2 is a diagram showing an example of a worktable configured to fixedly mount a machining target shown in FIG. 1.
Figure 2:
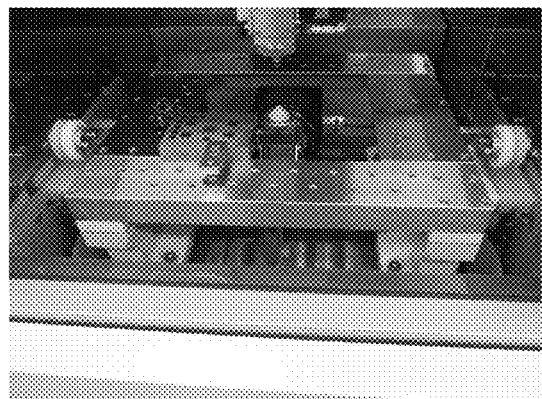
Figure 2:
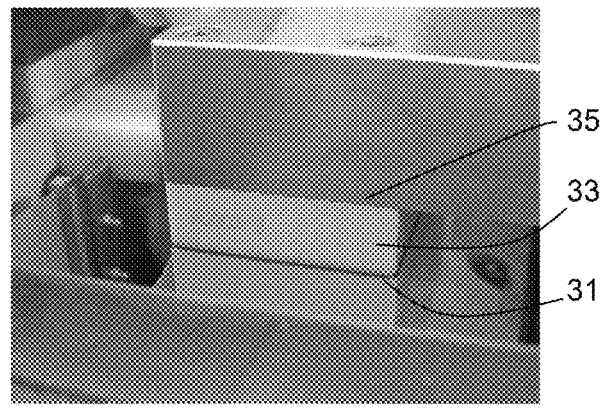

FIG. 2 is a diagram showing an example of a worktable on which the machining target 19 shown in FIG. 1 is fixedly mounted. FIG. 2 (a) shows a schematic configuration of the worktable. FIG. 2(b) shows an overall configuration of an actually manufactured worktable. FIG. 2(c) is an enlarged view of a multi-layer structure shown in FIG. 2(b).

As shown in FIG. 2(a), the worktable according to the present embodiment has a multi-layer structure. The worktable includes: metal foot members 31 (which correspond to an example of the "foot members" in the appended claims, the hardness of which is not restricted in particular); a ceramic layer 33 configured to provide insulation (which corresponds to an example of the "insulating layer" in the appended claims); and a metal layer 35 formed on the ceramic layer 33 so as to mount the machining target 19 such that they are in contact with each other (formed of a metal material that allows a current to readily flow and that has hardness that provide high scratch resistance to mounting the machining target 19, examples of which include a steel alloy subjected to heat treatment).

Specific description will be made regarding the configuration of the worktable according to the present embodiment. The worktable includes a pair of heads, i.e., an upper head 37 and a lower head 39. A current supply unit 41 is arranged in order to supply a current to the metal layer 35. The machining target 19 is fixedly mounted on the metal layer 35. A current is supplied to the machining target 19 via the metal layer 35. The current supply unit 43 is arranged in order to supply a current to the heads 37 and 39.

First, an arrangement apparently seems conceivable in which all the components of the worktable are formed of a metal material. However, in this case, the floating capacitance is determined based on the relation between the machining target and the entire area of the machining device, leading to a problem of a large floating capacitance.

In order to solve such a problem, conventionally, as a conceivable arrangement, such a worktable is formed of a ceramic material (insulating material), and a workpiece is provided with electrical wiring, thereby providing a reduced floating capacitance. However, with such an arrangement in which such a workpiece is provided with electrical wiring, this leads to a problem of increased restrictions.

With the present embodiment, the worktable has a multi-layer structure. In this case, the ceramic layer 33 provides insulation, thereby maintaining high workability. Furthermore, such an arrangement allows the surface area of the worktable to be reduced. With such an arrangement, the floating capacitance is substantially determined by the reduced surface area of the worktable and the surface area of the head, thereby providing a sufficiently reduced floating capacitance. Thus, such an arrangement provides improved workability as compared with an arrangement in which all the components of the table are formed of an insulating material. Furthermore, with such an arrangement, the electrically conducting portion of the table that is in contact with the workpiece has only a small area, thereby providing a reduced floating capacitance. FIG. 2 (c) is a diagram showing a current supply method for supplying a current to the metal layer 35.

Next, description will be made regarding an example of the operation of the current supply circuit First, when the switching element 13 is turned off, no current flows in the current supply circuit 3.

When the switching element 13 is turned on, the power supply 7 applies a voltage to the capacitor 11 and the electrical discharge machining unit 5, thereby charging the capacitor 11 and the floating capacitance 21. The floating capacitance 21 is charged using a current $((I_{r1})$ that flows through the resistor 9.

When the voltage at the electrical discharge machining unit 5 reaches a predetermined value (which will be referred to as the "discharge voltage" hereafter), a discharge occurs in the electrode gap between the electrode 17 and the machining target 19. In this state, a current flows through the gap between the electrode 17 and the machining target 19, thereby forming an electrically conducting path. A particular period of time is required due to the coil 15 before a sufficiently large amount of current flows to the electrical discharge machining unit 5 and the floating capacitance 21. Thus, when a discharge occurs in the gap between the electrode 17 and the machining target 19, a large part of the current that flows through the electrode gap is mainly supplied from the floating capacitance 21.

After the floating capacitance 21 is discharged, the voltage at the floating capacitance suddenly drops. As a result, the voltage $V_0$ becomes lower than the discharge voltage. In this state, the floating capacitance 21 is charged using the current $I_{c1}$ supplied from the capacitor 11, in addition to the current $I_{r1}$ supplied via the resistor 9. Subsequently, after the voltage $V_0$ exceeds the discharge voltage again, a discharge occurs the electrode gap between the electrode 17 and the machining target 19. Description will be made later with reference to simulation results regarding such an arrangement configured to employ the capacitor 11 to provide high-speed charging so as to reduce the discharge period as compared with an arrangement that does not employ such a capacitor 11. Such an arrangement provides high-efficiency machining, thereby providing an improved machining rate. Thus, such arrangement is capable of reducing the probability of the effects of disturbance (vibration applied externally, fluctuation in the power supply voltage, variation in the temperature, and the like. This provides machining with improved surface roughness in a stable manner.

Figure 3:
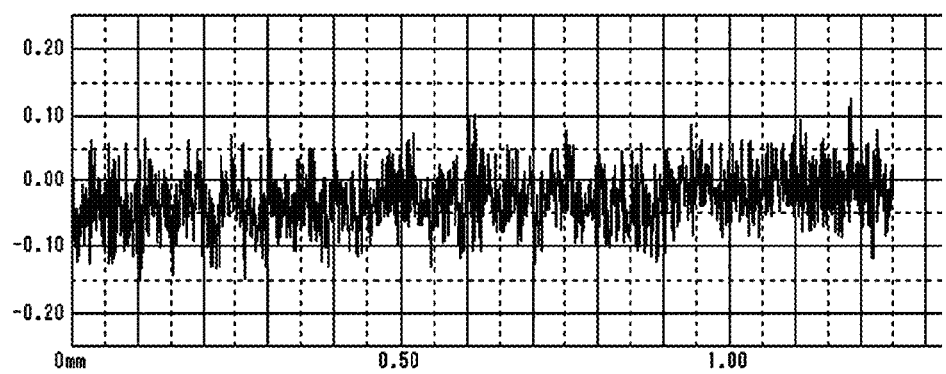
FIG. 3 is a diagram showing the measurement results of surface roughness obtained in actual machining.

FIG. 3 is a diagram showing measurement results of surface roughness obtained by means of actual machining. The horizontal axis represents the position in units of "mm". The vertical axis represents the roughness in cross-section in units of "µm". A standard pickup was used for the measurement. The calculation conforms to "JIS-B0601 2001 version". The measurement was performed for a measurement length of 1.25 mm with a cutoff wavelength of 0.25 mm. FIG. 3 shows the maximum height surface roughness.

Figure 4:
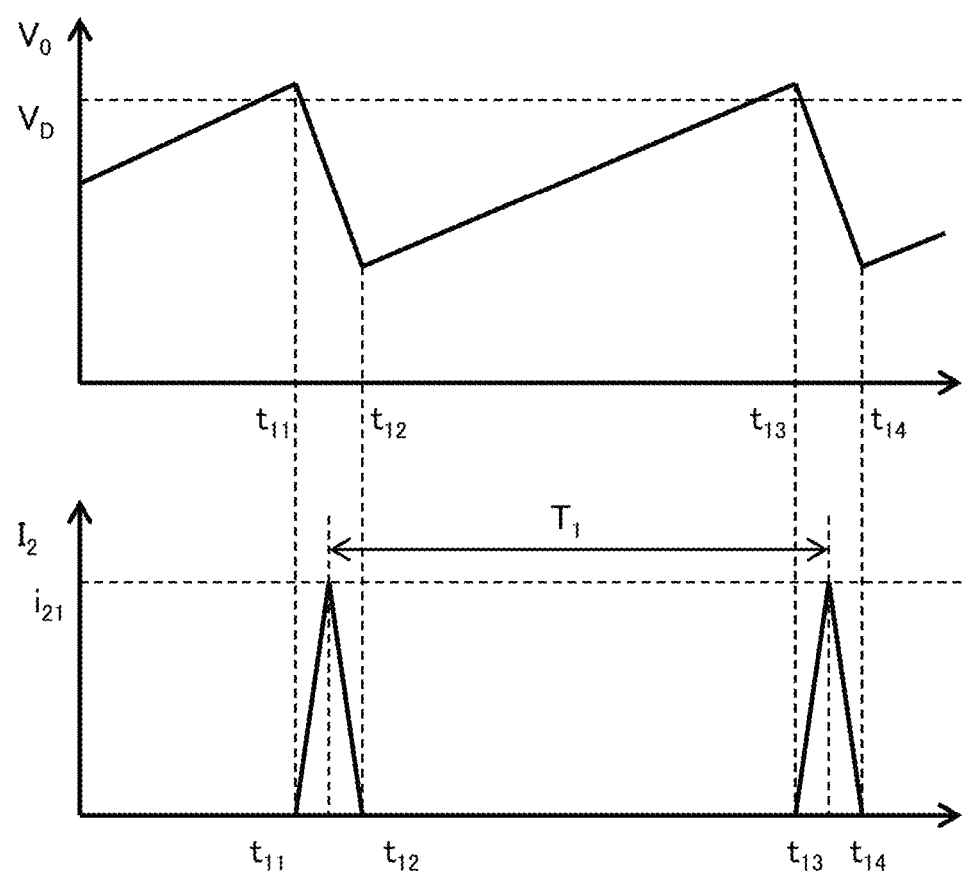
FIG. 4 is a diagram showing an example of the voltage $V_0$ and the current 12 in a case in which the capacitor 11 shown in FIG. 1 is not provided.
Figure 5:
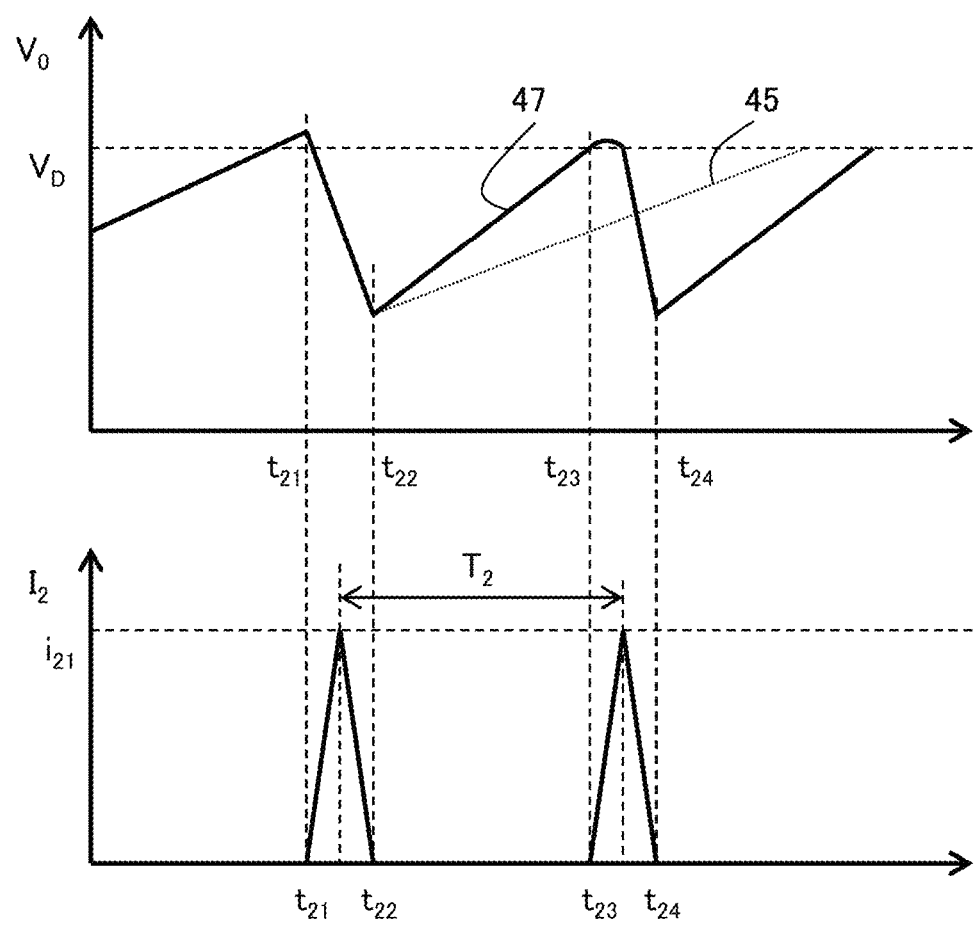
FIG. 5 is a diagram showing an example of the voltage $V_0$ and the current $I_2$ in a case which the capacitor 11 shown in FIG. 1 is provided.

Next, description will be made with reference to FIGS. 4 and 5 regarding an arrangement including the capacitor 11 shown in FIG. 1 and an arrangement that does not include such a capacitor 11. In FIGS. 4 and 5, the horizontal axis represents time. In the upper graph, the vertical axis represents the voltage $V_0$. In the lower graph, the vertical axis represents the current $I_2$. $V_D$ represents the discharge voltage. The symbol "$i_{21}$" represents the peak value of the pulse current.

FIG. 4 is a diagram showing an example of the voltage $V_0$ and the current $I_2$ in a case in which such a capacitor 11 shown in FIG. 1 is not employed. When the floating capacitance 21 is charged, the voltage $V_0$ rises, and the voltage $V_0$ exceeds the discharge voltage $V_D$ at the time point $t_{11}$. In this state, the charge stored in the floating capacitance 21 is discharged, and accordingly, the voltage across the floating capacitance 21 suddenly drops. Subsequently, the discharge is completed at the time point $t_{12}$. A pulse current is generated during a period from the time point $t_{11}$ to the time point $t_{12}$. Upon completion of the discharge, the floating capacitance 21 is charged again by means of the power supply 7. When the voltage $V_0$ exceeds the discharge voltage $V_D$ again at the time point $t_{13}$, the charge stored in the floating capacitance 21 is discharged, and the voltage across the floating capacitance 21 suddenly drops. This cycle is repeated, thereby generating a pulse current with a period $T_1$.

FIG. 5 is a diagram showing an example of the voltage $V_0$ and the current $I_2$ in a case in which such a capacitor 11 shown in FIG. 1 is employed. When the floating capacitance 21 is charged, the voltage $V_0$ rises, and the voltage $V_0$ exceeds the discharge voltage $V_D$ at the time point $t_{21}$. In this state, the charge stored in the floating capacitance 21 is discharged, and accordingly, the voltage across the floating capacitance 21 suddenly drops. Subsequently, the discharge is completed at the time point $t_{22}$. A pulse current is generated during a period from the time point $t_{21}$ to the time point $t_{22}$. Upon completion of the discharge, the floating capacitance 21 is charged again by means of the power supply 7 and the capacitor 11. The floating capacitance 21 is charged using the charge stored in the capacitor, and the charging as represented by the line 47 is faster than that represented by the line 45 (line from the time point $t_{12}$ to the time point $t_{13}$. Thus, the voltage $V_0$ exceeds the discharge voltage $V_D$ again at the time point $t_{23}$, which is earlier than the time point $t_{13}$. In this state, the charge stored in the floating capacitance 21 is discharged, and the voltage across the floating capacitance 21 sudden drops. This cycle is repeated, thereby generating a pulse current with a period $T_2$. Thus, such an arrangement provides the pulse current with the period $T_2$ that is shorter than the period $T_1$.

Figure 6:
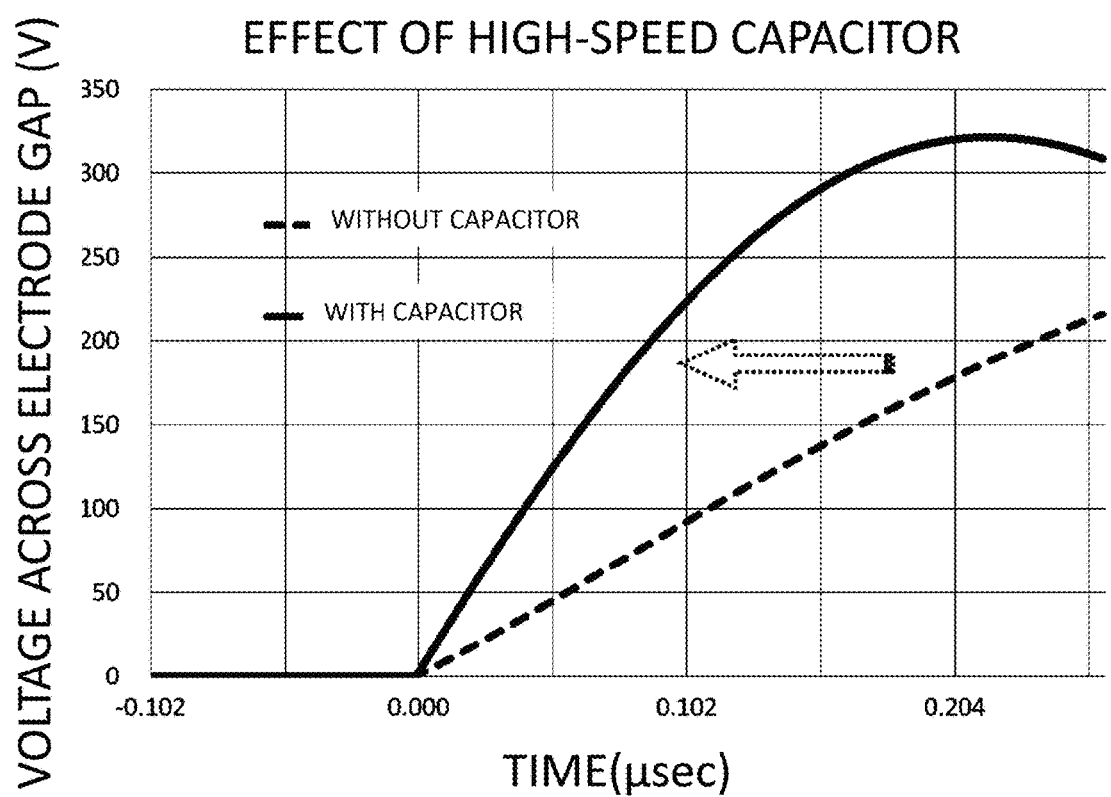
FIG. 6 shows the simulation result calculated under the same conditions with that of the actual discharge machining.

FIG. 6 shows the simulation result calculated under the same conditions with that of the actual discharge machining. The horizontal axis represents the time (µsec) from the charging start time point. The vertical axis represents the voltage across the electrode gap. For example, in a case in which such a capacitor is not employed, such an arrangement requires a time of 0.234 µsec to raise the voltage across the electrode gap to 200 V. In contrast, in a case in which such a capacitor is employed, such an arrangement requires only a time of 0.087 µsec to raise the voltage across the electrode gap to 200 V. Thus, such an arrangement allows the voltage across the electrode gap to rise approximately 2.6 times faster than an arrangement in which such a capacitor is not employed. Thus, it can be understood that there is a great difference in the rate at which the floating capacitance is charged between an arrangement employing such a capacitor 11 and an arrangement that does not employ such a capacitor 11.

Next, description will be made regarding an example of a design method for determining the resistance value $R_1$ of the resistor 9, the capacitance $C_1$ of the capacitor 11, and the inductance value $L_x$ of the coil 15.

First, the resistance value of the resistor 9 is determined based on the current value supplied from the power supply 7 to the floating capacitance 21 and the discharge machining unit 5. In a case in which the current supplied from the power supply 7 is excessively large, a current continuously flows through the electrode gap. Thus, the resistance value of the resistor 9 is determined so as to provide a current value such that a discharge does not continuously occur in the electrode gap.

Next, the inductance value of the coil 15 is determined. In a case which the inductance value of the coil 15 is excessively small, a current flows from the power supply 7 side to the electrode gap during a period in which a discharge occurs in the electrode gap. Thus, in this case, a current continuously flows through the electrode gap. In order to solve such a problem, the inductance of the coil 15 is determined such that no current flows from the power supply 7 to the electrode gap and a current due to the charge stored in the floating capacitance flows to the electrode gap during a period in which a discharge occurs. Furthermore, the inductance of the coil 15 is determined such that, after the completion of the discharge, the current supplied from the power supply 7 side is stored in the floating capacitance 21.

Next, the capacitance of the capacitor 11 is determined. In a case in which the capacitor 11 has an excessively large capacitance, overshoot occurs in a step in which the floating capacitance 21 is charged, leading to the occurrence of a discharge in the electrode gap. This leads to a large discharge, which leads to degraded surface roughness. In order to solve such a problem, the capacitance of the capacitor 11 is determined so as to prevent the occurrence of such overshoot.

Figure 7:
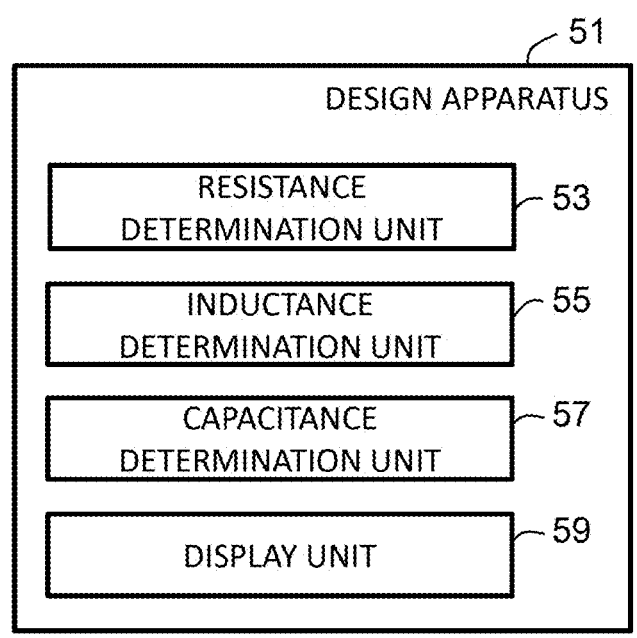
FIG. 7 is a block diagram showing an example configuration of a design apparatus for designing the current supply circuit 3 shown in FIG. 1.
Figure 8:
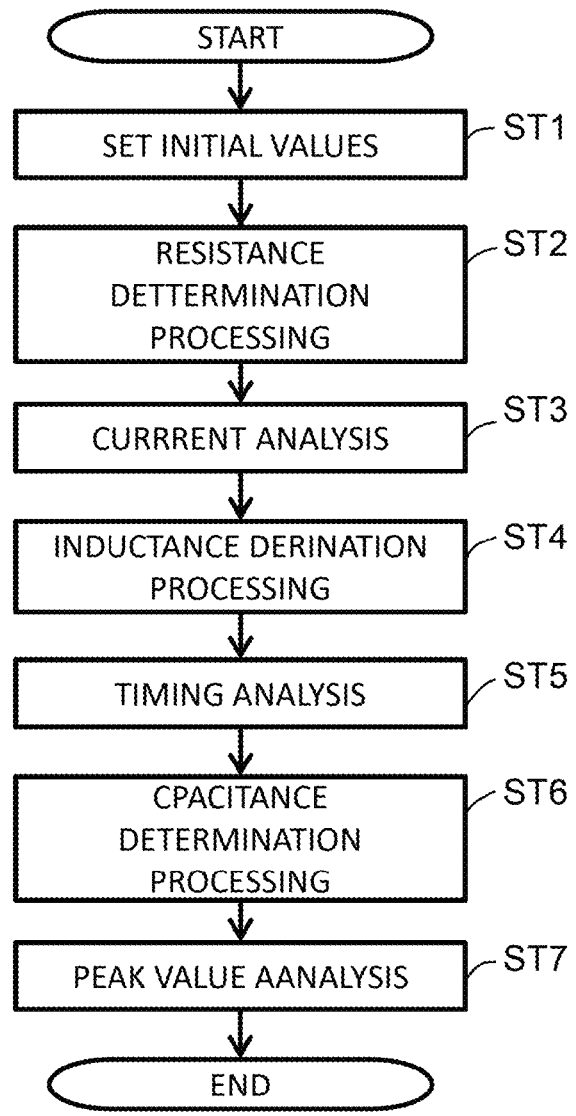
FIG. 8 is flowchart showing an example of the operation of a design apparatus 51 shown in FIG. 7.

FIG. 7 is a block diagram showing an example configuration of a design apparatus for designing the current supply circuit 3 shown in FIG. 1. FIG. 8 is a flowchart showing an example of the operation of a design apparatus 51 shown in FIG. 7. The design apparatus 51 includes a resistance determination unit 53, an inductance determination unit 55, a capacitance determination unit 57, and a display unit 59.

First, the design apparatus 51 receives the initial setting values, i.e., the voltage of the power supply 7, the capacitance of the floating capacitance 21, and the electrical characteristics of the electrical discharge machining unit 5 (Step ST1).

The resistance determination unit 53 determines the resistance of the resistor 9 according to an operation by the user (Step ST2).

Next, the resistance determination unit 53 determines the current that flows through the resistor 9. For example, a case in which the power supply 7 supplies a voltage of 500 V, and the resistor 9 is configured to have a resistance value of 1 kΩ, a current of 0.5 A flows through the resistor 9. The resistance determination unit 53 performs analysis of whether or not the current flowing through the resistor leads to the occurrence of a continuous discharge in the electrode gap (Step ST3).

The resistance determination unit 53 may instruct the display unit 59 to display the current that flows through the resistor 9. When the user gives an instruction to change the resistance value of the resistor 9, the flow returns to the operation in Step ST2 in which the resistance determination unit 53 performs the analysis again.

The inductance determination unit 55 determines the inductance of the coil 15 according to an operation by the user (Step ST4).

Next, the inductance determination unit 55 performs analysis of the current that flows from the power supply 7 side toward the floating capacitance 21 side according to the passage of time from the time point at which the occurrence of a discharge starts in the electrode gap. Furthermore, the inductance determination unit 55 performs analysis of whether or not the amount of such a current is equal to or larger than a predetermined value during a period of time from the electrode gap discharge start point up to the electrode gap discharge end point. In such a judgement based on comparison with the predetermined value, the current may be compared with a fixed value. Also, the judgement may be made in a relative manner, i.e., may be compared with a current that flows from the floating capacitance 21.

The inductance determination unit 55 may instruct the display unit 59 to display the current value according to the passage of time in the form of a graph or the like. When the user gives an instruction to change the inductance of the coil 15, the flow returns to the operation in Step ST4, and the inductance determination unit 55 performs the analysis again.

The capacitance determination unit 57 determines the capacitance of the capacitor 11 according to an operation by the user (Step ST6).

The capacitance determination unit 57 performs analysis of the voltage across the electrode gap after a discharge ends. Furthermore, the capacitance determination unit 57 performs analysis of whether or not a discharge occurs using a peak current value supplied from the charged capacitor 11 (Step ST7).

The capacitance determination unit 57 may instruct the display unit 59 to display the voltage value according to the passage of time in the form of a graph or the like. When the user gives an instruction to change the capacitance of the capacitor 11, the flow returns to the operation in Step ST6, and the capacitor determination unit 57 performs the analysis again.

It should be noted that the electrical discharge machining unit 5 employs water, oil, or the like, for example, as the machining liquid provided as an insulator between the electrode 17 and the machining target 19. There a difference between an arrangement employing oil and an arrangement employing water in terms of characteristics such as an oxidation-reduction reaction or elution of a material that forms the machining target, deposition of a foreign material etc. Thus, there is a need to provide a difference between an arrangement employing oil and an arrangement employing water in the power supply configuration and the control method for controlling the power supply polarities. In particular, in a case of employing water as the machining liquid, in many cases, such an arrangement has a problem of galvanic corrosion. In order to solve such a problem, the polarities of the machining target and the electrode are switched with a predetermined frequency so as to suppress the occurrence of galvanic corrosion. The power supply includes a switching apparatus configured to switch the polarities. In a case of employing oil as the machining liquid, such a switching operation is not required in particular. (see Japanese Patent Application Laid Open No. H02-279214).

Next, specific description will be made with reference to FIGS. 9 and 10 regarding the advantage in employing the capacitor 11 and the coil 15 based on the comparison results obtained using actual circuits between an arrangement employing neither the capacitor 11 nor the coil 15 shown in FIG. 1 (circuit shown in FIG. 9) and an arrangement employing both the capacitor 11 and the coil 15 (circuit shown in FIG. 10).

Figure 9:
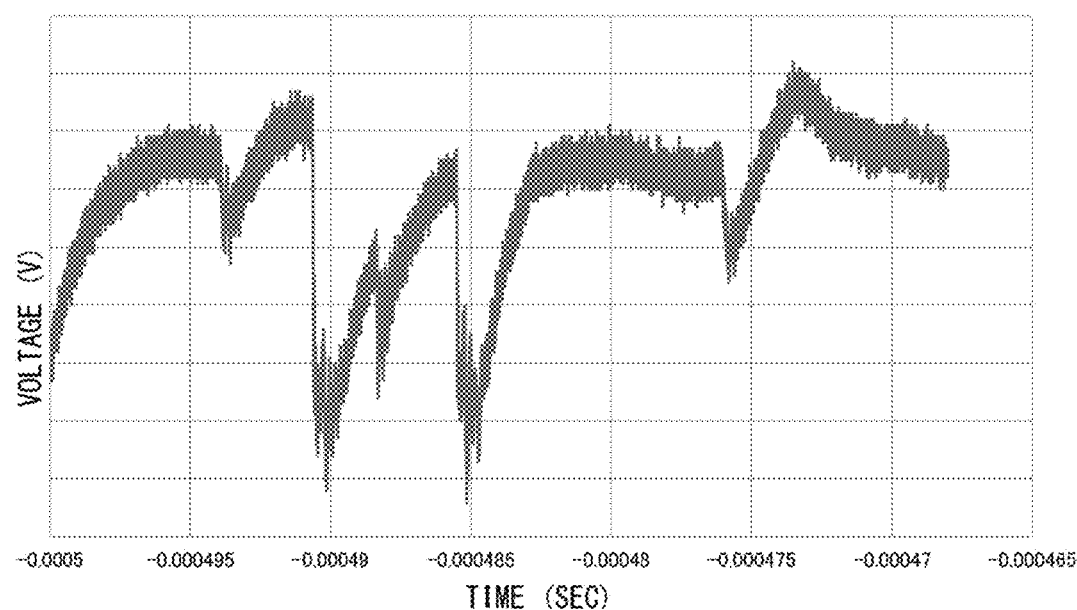
FIG. 9 is a graph showing the voltage measurement results obtained by measuring the voltage between the wire electrode 17 and the machining target 19 in actual electrical discharge machining using an actual circuit employing neither the capacitor 11 nor the coil 15 shown in FIG. 1.

FIG. 9 is a graph showing the voltage measurement results obtained by measuring the voltage between the wire electrode 17 and the machining target 19 in actual electrical discharge machining using an actual circuit employing neither the capacitor 11 nor the coil 15 shown in FIG. 1. In this case, it has been confirmed that an effective discharge occurred twice during a period shown in the graph. Furthermore, an event that can be considered to be a secondary discharge was observed three times. Here, the "secondary discharge" collectively represents a discharge that differs from an electrical discharge to be used for electrical discharge machining. Conceivable main examples of such a discharge include an indirect discharge that flows to sludge or the like that occurs in the electrical discharge machining.

Figure 10:
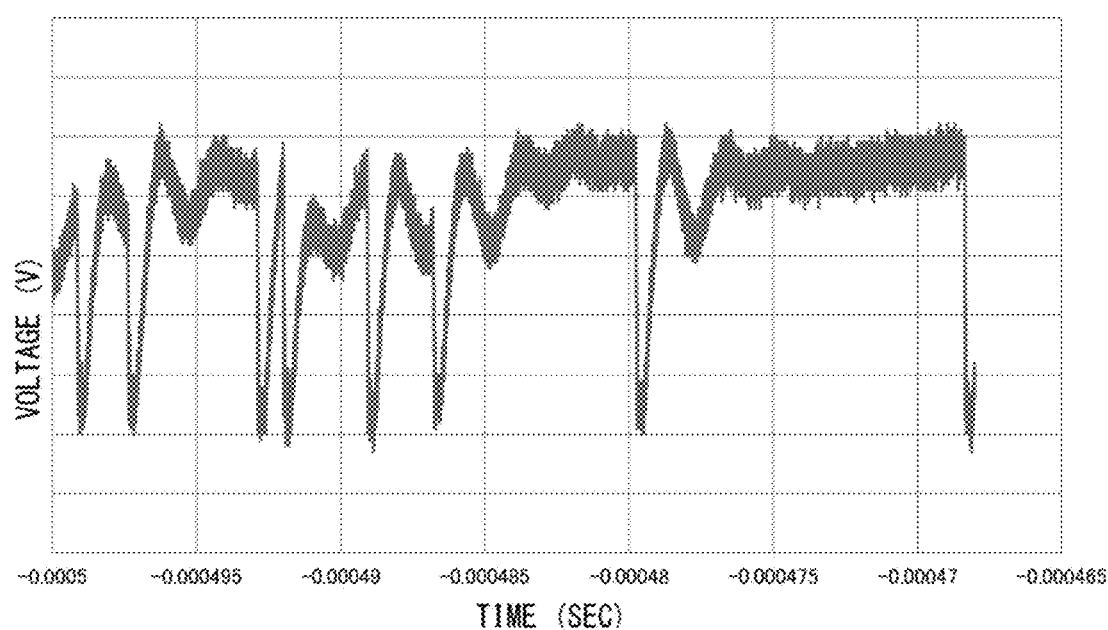
FIG. 10 is a graph showing the voltage measurement results obtained by measuring the voltage between the wire electrode 17 and the machining target 19 in actual electrical discharge machining using an actual circuit employing both the capacitor 11 and the coil 15 shown in FIG. 1.

FIG. 10 is a graph showing the voltage measurement results obtained by measuring the voltage between the wire electrode 17 and the machining target 19 in actual electrical discharge machining using an actual circuit employing both the capacitor 11 and the coil 15 shown in FIG. 1. In this case, it has been confirmed that an effective discharge occurred eight times during a period shown in the graph. Furthermore, no secondary discharge was observed. By respectively setting the capacitance of the capacitor and the coil inductance to appropriate values, such an arrangement provides a voltage waveform without overshoot. Thus, such an arrangement requires only a minimum amount of charge to provide an electrical discharge. Thus has been confirmed that the capacitor 11 has a function of ensuring the amount of charge that allows the floating capacitance to be charged with a high charging rate. Furthermore, it has been confirmed that the coil 15 has a function of delaying the charging timing at which the charging by means of the power supply unit is started, as compared with the discharge time. Thus, such an arrangement provides a charging time and a discharge time that are separate from each other. Moreover, it has been confirmed that by generating an oscillation by means of the capacitor 11 and the coil 15, such an arrangement is capable of providing a function generating appropriate overshoot so as to charge the floating capacitance with a high charging rate in a stable manner.

REFERENCE SIGNS LIST 1 electrical discharge machining device, 3 current supply circuit, 5 electrical discharge machining unit, 9 resistor, 11 capacitor, 13 switching element, 15 coil, 17 electrode, 19 machining target, 21 floating capacitance, 31 metal foot member, 33 ceramic layer, 35 metal layer, 37, 39 head, 41, 43 current supply unit, 45, 47 line, 51 design apparatus, 53 resistance determination unit, 55 inductance determination unit, 57 capacitance determination unit, 59 display unit.

The invention claimed is:

1. An electrical discharge machining method employed in a current supply circuit that supplies a current to a gap between an electrode and a machining target so as to provide electrical discharge machining, wherein the current supply circuit comprises
    a power supply,
    a coil between the power supply and the electrode, and
    a switching element that controls whether or not a voltage is applied to the gap between the electrode and the machining target,
    wherein a floating capacitance portion occurs in the gap between the electrode and the machining target,
    wherein the switching element continuously applies a voltage to the gap between the electrode and the machining target during a period in which the floating capacitance portion is discharged and the floating capacitance portion is charged and discharged again, and
    wherein the electrical discharge machining method comprises:
    charging the floating capacitance portion that occurs between the electrode and the machining target by applying a voltage to the gap by the power supply;
    discharging a charge stored in the floating capacitance portion to the gap in a state in which the coil is delaying charge of the gap by the power supply such that a voltage of the gap becomes lower than a discharge voltage, when the voltage of the gap given by the floating capacitance portion exceeds the discharge voltage;
    re-charging the floating capacitance portion again by applying a voltage to the gap by the power supply; and
    re-discharging the charge stored in the floating capacitance portion to the gap in a state in which the coil is delaying charge of the gap by the power supply, when the voltage of the gap given by the floating capacitance portion again exceeds the discharge voltage.

2. The electrical discharge machining method according to claim 1,
    wherein the switching element continuously applies a voltage to the gap while the floating capacitance portion is discharged a plurality of times, and the coil provides a charging time and a discharge time that are separate from each other.

3. The electrical discharge machining method according to claim 1,
    wherein the current supply circuit comprises a charge storage between the powE supply and the coil,
    wherein the charge storage stores a charge in the power supply before a discharge of the floating capacitance portion is completed,
    wherein the coil delays charge of the gap by the power supply and the charge storage while the charge stored in the floating capacitance portion is discharged to the gap, and
    wherein the charge storage charges the floating capacitance portion using the charge thus stored after the floating capacitance portion is discharged.

4. The electrical discharge machining method according to claim 3,
    wherein the coil and the charge storage provide a voltage waveform without overshoot and inhibit secondary discharge.

5. The electrical discharge machining method according to claim 3,
    wherein the current supply circuit comprises:
    a resistor connected in series with the electrode and the machining target between the power supply and the coil,
    and wherein the charge storage is connected in parallel with the resistor.

6. The electrical discharge machining method according to claim 1,
    wherein the machining target is fixedly mounted on a worktable configured such that a current is supplied to the machining target via the worktable,
    and wherein the worktable has a multi-layer structure comprising:
    an insulating layer that provides electrical insulation between foot members of the worktable and a holder that fixedly holds the machining target; and
    an electrically conducting layer that allows a current to be supplied to the machining target.

7. The electrical discharge machining method according to claim 1,
    wherein wire electrical discharge machining is performed as the electrical discharge machining,
    and wherein the electrical discharge machining device comprises an electrode switching circuit that switches the polarities of the electrode and the machining target with a predetermined frequency.

8. A design method for designing a current supply circuit configured to supply a current to a gap between an electrode and a machining target so as to provide electrical discharge machining,
    wherein the current supply circuit comprises:
    a power supply;
    a resistor;
    a coil;
    a charge storage; and
    a switching element,
    wherein the power supply, the resistor and the coil are connected in series with the electrode and the machining target,
    wherein the charge storage is connected in parallel with the resistor,
    wherein, in the electrical discharge machining,
    the switching element continuously applies a voltage to the gap between the electrode and the machining target during a period in which the floating capacitance portion is discharged and the floating capacitance portion is charged and discharged again,
    after a charge stored in the floating capacitance portion is supplied to the gap, the power supply charges the floating capacitance portion, and
    a charge stored in the floating capacitance portion is discharged to the gap in a state in which the coil is delaying charge of the gap by the power supply, and
    wherein the design method comprises:
    determining a resistance of the resistor based on a current value that flows from the power supply side to the floating capacitance portion side;

determining an inductance of the coil based on a period of time from a time point at which the electrical discharge machining is started to a time point at which the current that flows from the power supply side to the floating capacitance portion side rises so that the coil delays charge of the gap by the power supply when a charge of the floating capacitance portion is supplied to the gap; and determining a capacitance of the charge storage based on a change in a voltage at the gap after the electrical discharge machining is started.

* * * * *